Feb. 16, 1932. M. KUZMICZ 1,845,292
SPARE TIRE SUPPORT FOR AUTOMOBILES
Filed Oct. 18, 1928 2 Sheets-Sheet 1
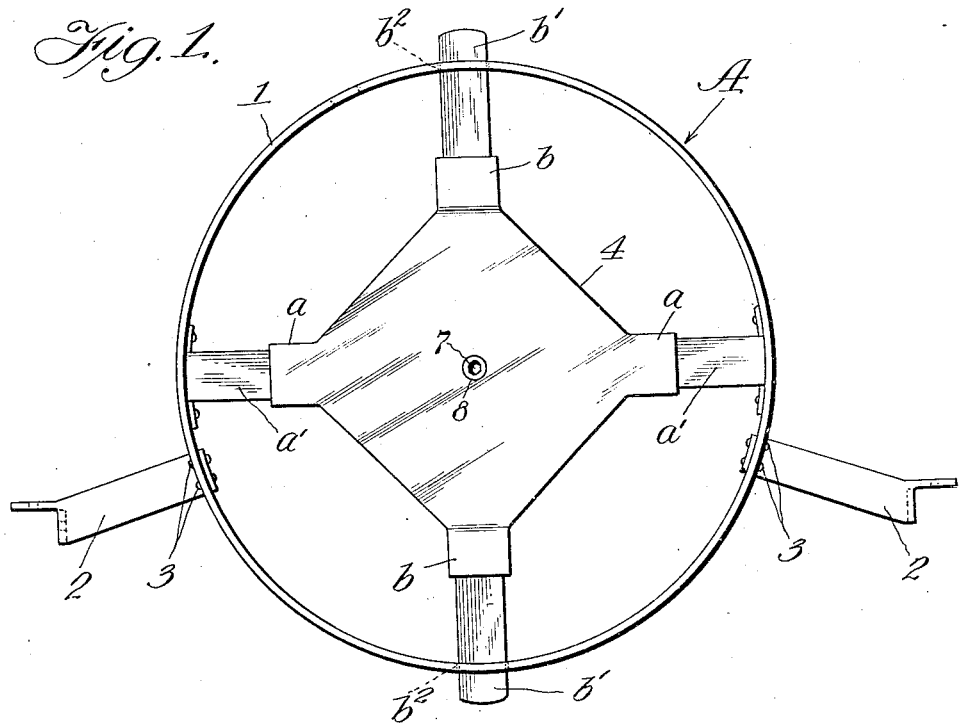
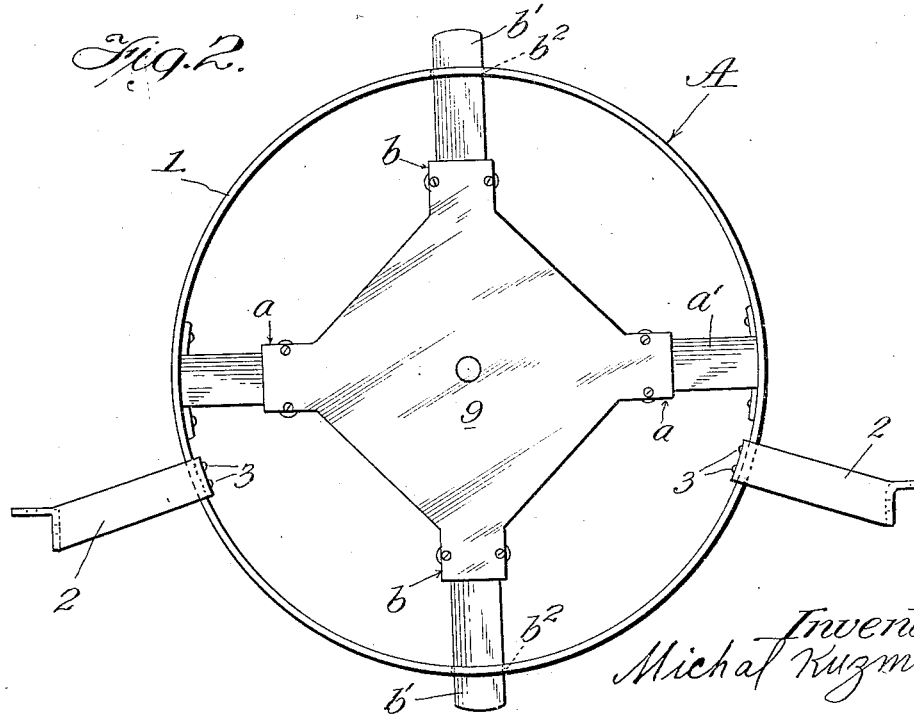
Inventor:
Michał Kuzmicz Feb. 16, 1932.  M. KUZMICZ  1,845,292
SPARE TIRE SUPPORT FOR AUTOMOBILES
Filed Oct. 18, 1928   2 Sheets-Sheet 2
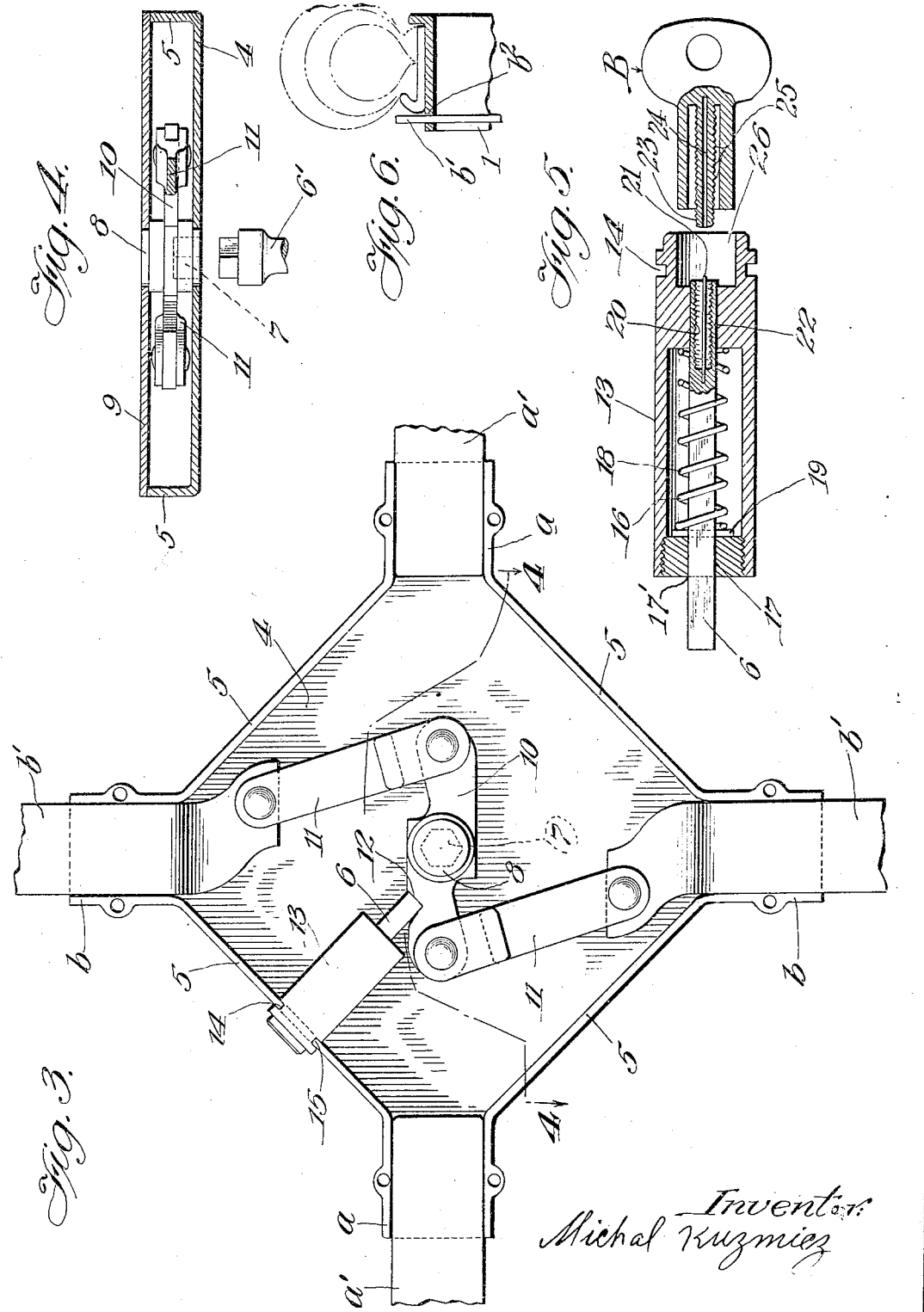

Patented Feb. 16, 1932

1,845,292

UNITED STATES PATENT OFFICE

MICHAL KUZMICZ, OF CHICAGO, ILLINOIS

SPARE TIRE SUPPORT FOR AUTOMOBILES

Application filed October 18, 1928. Serial No. 313,254.

My invention relates to spare tire support for automobile use, and is of that type which is fastened to the rear of an automobile as by means of brackets for carrying the same. The spare tire support in this instance has embodied within a main body or casing, locking expedients for locking the spare tire upon the support, as by a special lock and key.

The principal object of this invention is to provide a tire and rim carrier that is theft proof.

More specifically, the object of this invention is to provide a tire and rim carrier comprising a square shaped housing supported by arms extending fixedly to the spare tire rim support and in turn supported to the automobile as by brackets.

Another object of this invention is to provide a tire and rim carrier support that will permit easy removal or replacement of a tire and rim, as by means of radial distendable arms operated by a mechanical mechanism located within the square-shaped housing, to the annular rim support.

Another object is to provide the above mentioned square-shaped housing with a locking mechanism, said locking mechanism comprising an elongated square body, the cross-section dimension being that of the depth of the housing. The said elongated square body of the locking mechanism is provided with grooves to adapt it to be placed in a notch in the housing, and a cover plate retains the locking mechanism securely in place.

Another object of this invention is to provide the tire carrier with a simple locking means for locking securely the applied rim and tire upon the tire carrier in a substantial, practical, compact and inexpensive manner and which may be attached to any suitable portion of an automobile.

Another object of the invention is to conceal the locking means and its associated parts within a casing and mounted within the plane of an annular tire support or ring member.

A further object is a special helical means incorporated in the lock cooperating with helical means of a key for locking and unlocking the distendable and retractable member for locking the tire and tire rim to the tire support.

The features of construction of the lock and key are similar to those outlined in my previous application filed June 30, 1928, Serial No. 289,395. The various new features of detail construction will be set forth in the several views of the drawings and specification and brought out in the appended claim.

Figure 1 is a front elevation of the tire support;

Figure 2 is a rear elevation of the same;

Figure 3 is a similar view, but fragmentary in some respects, illustrating the several locking members;

Figure 4 is fragmentary horizontal transverse sectional view taken on the line 4—4 of Figure 3;

Figure 5 is a detail view in cross section of the special lock, as illustrated in exterior only in Figure 3 of the drawings, and a special key to be used therewith;

Figure 6 is a fragmentary cross sectional view of the retaining arm and ring member.

I will explain my invention more fully by reference to the accompanying drawings, in which like characters of reference designate like parts throughout the drawings.

A spare tire support is designated as an entirety by the reference character A, comprising an annular metal ring member 1, and is provided with supporting brackets 2—2, respectively, securely fastening the said ring 1 as by means of rivets 3 as shown. The supporting brackets 2—2 are for the purpose of fastening the spare tire support to the frame of the automobile, which has not been illustrated.

Mounted practically within the plane of the aforesaid annular ring member 1 is a casing 4, having flanges 5 as indicated, terminating at the four corners into rectangular shaped portions a—a and b—b, respectively. The portions a—a serve as a means of fastening the casing 4 to the ring member 1 as by means of arms a' a' which are provided with feet conforming to the circular shape of the ring member 1 and in turn riveted thereto as shown; and the rectangular shaped portions b—b accommodate the distendable arms b' b'. These said arms are for the purpose of retaining the spare tire upon the annular ring member 1 when in the position shown in the various drawings. As will be noticed by referring particularly to Figure 6 of the drawings, the said arms b' b' protrude through slots b² b², respectively in the ring member 1. It will be seen that the spare tire can not be withdrawn from the ring member 1 until the arms b' b' have been retracted within the outside diameter of the ring member 1, and this is accomplished first by unlatching the lock bolt 6 by the use of a special key and then inserting a wrench 6' into the hexagon shaped hole 7 located in the center of the short shaft 8 and giving it a slight turn clockwise. The shaft 8 as will be seen, is trunnioned in the front face of the casing 4 and in a rear cover plate 9, and carries a cross arm 10 and is connected by links 11 to the aforesaid arms b' b', and pivoted. The cross arm 10 is provided with a notch 12 for the engagement of a lock bolt 6 of the special lock when all of the above mentioned members are in locked position as shown in Figure 3.

The special lock will now be described as having an elongated main body 13 preferably square in cross-section and having a groove 14 which is accommodated in the notched seat 15 in the flange 5 for the purpose of holding the lock in the casing securely. In the main body of the lock is a suitable bore 16 closed at one end as by a threaded plug 17 having a square hole 17' for the protrusion of the lock bolt 6 which is also made of a square rod of the proper dimension. The lock bolt 6 is pressed outwardly by means of a comparatively strong spring 18 bearing against the pin 19 driven through the lock bolt, the spring having bearing against the shouldered bore at the opposite end.

The square lock bolt is bored out at one end and internally threaded as shown at 20. In the center there is located a small stem 21 of any arbitrary shape, i. e., round, square, triangular, rectangular, etc. in cross-section. With this arrangement just described, the lock bolt is free to slide through the bearing 22 at the key end against the pressure of the strong spring 18 when the special key B associated and illustrated in the same figure of the drawing is inserted; in which the stem 23 is provided with external threads 25 corresponding with the internal threads 20 of the lock bolt 6. The stem 23 is provided with an elongated bore 24 for the reception of the stem 21. The stem 21 and bore 24 and the threads 20 and the threads 25 are mates with respect to shape and form, otherwise the key B cannot be inserted into the barrel portion 26 of the main body 13 for operating the lock bolt 6 for the retraction from engagement in notch 12 on the cross arm 10, for the purpose of removing the spare tire from the support A, as before described.

What I claim is new, and desire to secure by Letters Patent, is:

In a spare tire and rim support comprising an annular ring member, a flanged housing supported within the ring member, a rotatable notched cross arm provided with shouldered trunnions having bearings in said housing, distendable and retractable locking arms mounted eccentrically on said rotatable notched arm, as by toggle links, said distendable and retractable locking arms passing through the flanges of said housing and through the anular ring member for retaining the spare tire and rim, and an elongated square-shaped lock bolt body, notched to be received by a notch in the flange of aforesaid housing and held in place by a cover plate, and a lock bolt engaging the notch of the aforesaid rotatable arm for locking the spare tire and rim, as set forth.

MICHAL KUZMICZ.